United States Patent
Tatar et al.

(10) Patent No.: US 9,921,566 B1
(45) Date of Patent: Mar. 20, 2018

(54) ADVANCED REMOTE MATCH DRILLING PROCESS

(71) Applicant: The Boeing Company, Chicago, IL (US)

(72) Inventors: Monica Tatar, Bothell, WA (US); Kevin G. Sweeney, Everett, WA (US); Christopher M. Rhoads, Seattle, WA (US); Sidlaghatta N. Venkatesh, Renton, WA (US)

(73) Assignee: The Boeing Company, Chicago, IL (US)

( * ) Notice: Subject to any disclaimer, the term of this patent is extended or adjusted under 35 U.S.C. 154(b) by 1170 days.

(21) Appl. No.: 13/939,640

(22) Filed: Jul. 11, 2013

(51) Int. Cl.
*G06F 19/00* (2011.01)
*G05B 19/18* (2006.01)

(52) U.S. Cl.
CPC ................................ *G05B 19/182* (2013.01)

(58) Field of Classification Search
None
See application file for complete search history.

(56) References Cited

U.S. PATENT DOCUMENTS

| 7,725,206 | B2* | 5/2010 | Richey | G05B 19/401 700/118 |
| 7,860,601 | B2* | 12/2010 | Piggott | B23Q 17/20 382/152 |
| 8,190,272 | B2* | 5/2012 | Crothers | B23Q 17/20 700/15 |
| 9,222,769 | B2* | 12/2015 | Garvey | G01B 21/04 |
| 2008/0161961 | A1* | 7/2008 | Piggott | B23Q 17/20 700/114 |
| 2014/0157610 | A1* | 6/2014 | Garvey | G01B 21/04 33/503 |
| 2015/0026107 | A1* | 1/2015 | Vijayaraghavan | G06Q 10/06 706/12 |

OTHER PUBLICATIONS

Hung et al. "Refinement of Kernel and Functional Mechanisms for Automatic Virtual Metrology System", 2012 IEEE, pp. 472-477.*
Cheng et al. "Developing an Automatic Virtual Metrology System", 2011 IEEE, pp. 181-188.*

* cited by examiner

*Primary Examiner* — Van Nguyen
(74) *Attorney, Agent, or Firm* — Felix L. Fisher

(57) ABSTRACT

Fabricating a component is accomplished by operating a metrology system to obtain physical characteristics for an environment in which the component is to be installed. The physical characteristics for the environment are then transferred to a computer numerical control (CNC) machine and the component is fabricated to be compatible with the physical characteristics of the environment using the CNC machine.

17 Claims, 7 Drawing Sheets ial systems and more particularly to method and apparatus for match drilling of mating components using visual metrology devices for hole location determination and data download to computer aided manufacturing equipment for automated match location drilling.

Background

ADVANCED REMOTE MATCH DRILLING PROCESS

BACKGROUND INFORMATION

Field

Embodiments of the disclosure relate generally automated manufacturing systems and more particularly to method and apparatus for match drilling of mating components using visual metrology devices for hole location determination and data download to computer aided manufacturing equipment for automated match location drilling.

Background

Manufacturing of complex structures often requires manual match drilling for installation of components in major structural assemblies. Match drilling in place on such assemblies creates issues such as Foreign Object Debris (FOD), improper ergonomics, limited access environment, components damage during the process, additional inspection required, installation of protective equipment, training and unstable process which drives rework/rejection conditions.

It is therefore desirable to provide alternative methods for drilling of mating holes in components for assembly without requiring match drilling in place.

SUMMARY

The embodiments described herein provide a method for fabricating a component by operating a metrology system to obtain physical characteristics for an environment in which the component is to be installed. The physical characteristics for the environment are then transferred to a computer numerical control (CNC) machine and the component is fabricated to be compatible with the physical characteristics of the environment using the CNC machine.

The method is performed by a manufacturing system having a metrology device operable to obtain physical characteristics for an environment. A computer numerical control (CNC) machine operable to fabricate a component compatible with the physical characteristics of the environment is provided. A computer system is programmed to receive data from the metrology device related to the physical characteristics, convert the received data into a format compatible with said CNC machine, and transmit the converted data to said CNC machine for fabrication of the component.

The features, functions, and advantages that have been discussed can be achieved independently in various embodiments of the present disclosure or may be combined in yet other embodiments further details of which can be seen with reference to the following description and drawings.

DETAILED DESCRIPTION

Embodiments disclosed herein provide an Advanced Remote Match Drilling Process (ARMDP) using metrology devices for manufacturing process measurement of full dimension drilled hole position or other machined features on components, rather than inspection, in combination with control software elements for data transfer to computer aided manufacturing systems to drill matching holes or machine other matching features in mating components. The process allows machining of the features of the component outside of the production line which will remove the process from the build critical path providing improved accuracy and repeatability of the manufacturing process. Additionally, the process provides enhanced reparability and maintainability for operators to fabricate additional matching parts as needed.

Figure 1:
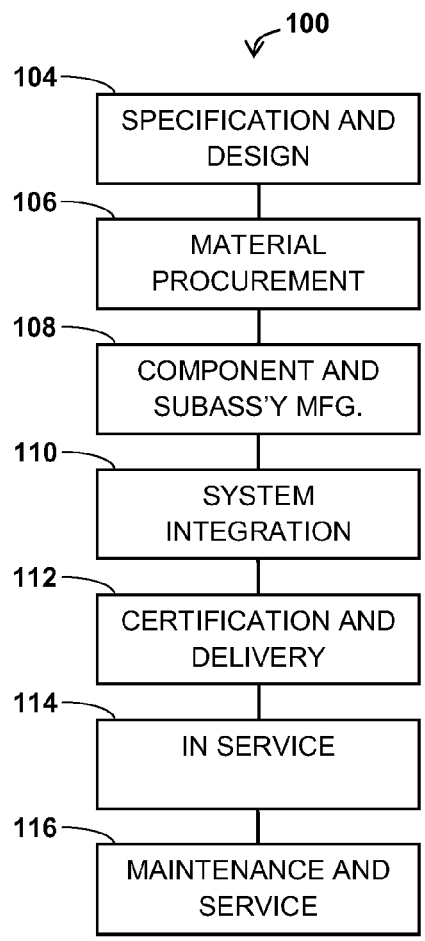
FIG. 1 is a flow diagram of aircraft production and service methodology.
Figure 2:
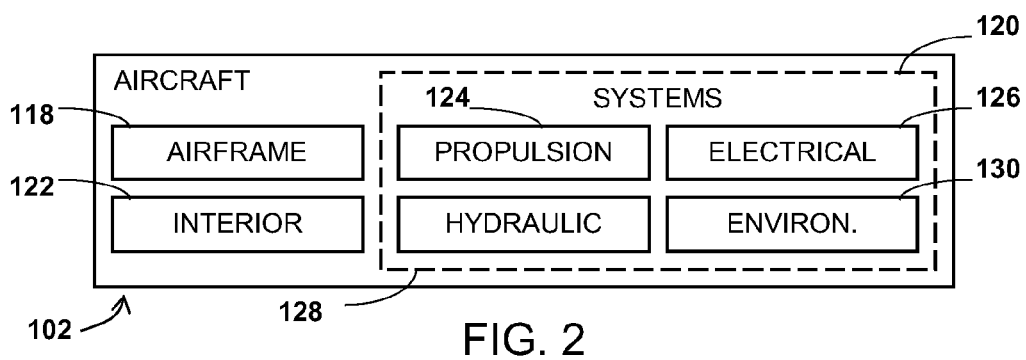
FIG. 2 is a block diagram of an aircraft.

Referring to the drawings, embodiments of the disclosure may be described in the context of an aircraft manufacturing and service method 100 as shown in FIG. 1 and an aircraft 102 as shown in FIG. 2. During pre-production, exemplary method 100 may include specification and design 104 of the aircraft 102 and material procurement 106. During production, component and subassembly manufacturing 108 and system integration 110 of the aircraft 102 takes place. Thereafter, the aircraft 102 may go through certification and delivery 112 in order to be placed in service 114. While in service by a customer, the aircraft 102 is scheduled for routine maintenance and service 116 (which may also include modification, reconfiguration, refurbishment, and so on).

Each of the processes of method 100 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 2, the aircraft 102 produced by exemplary method 100 may include an airframe 118 with a plurality of systems 120 and an interior 122. Examples of high-level systems 120 include one or more of a propulsion system 124, an electrical system 126, a hydraulic system 128, and an environmental system 130. Any number of other systems may be included. Although an aerospace example is shown, the principles of the invention may be applied to other industries, such as the automotive industry.

Apparatus and methods embodied herein may be employed during any one or more of the stages of the production and service method 100. For example, components or subassemblies corresponding to production process 108 may be fabricated or manufactured in a manner similar to components or subassemblies produced while the aircraft 102 is in service. Also, one or more apparatus embodiments, method embodiments, or a combination thereof may be utilized during the production stages 108 and 110, for example, by substantially expediting assembly of or reducing the cost of an aircraft 102. Similarly, one or more of apparatus embodiments, method embodiments, or a combination thereof may be utilized while the aircraft 102 is in service, for example and without limitation, to maintenance and service 116.

Figure 3:
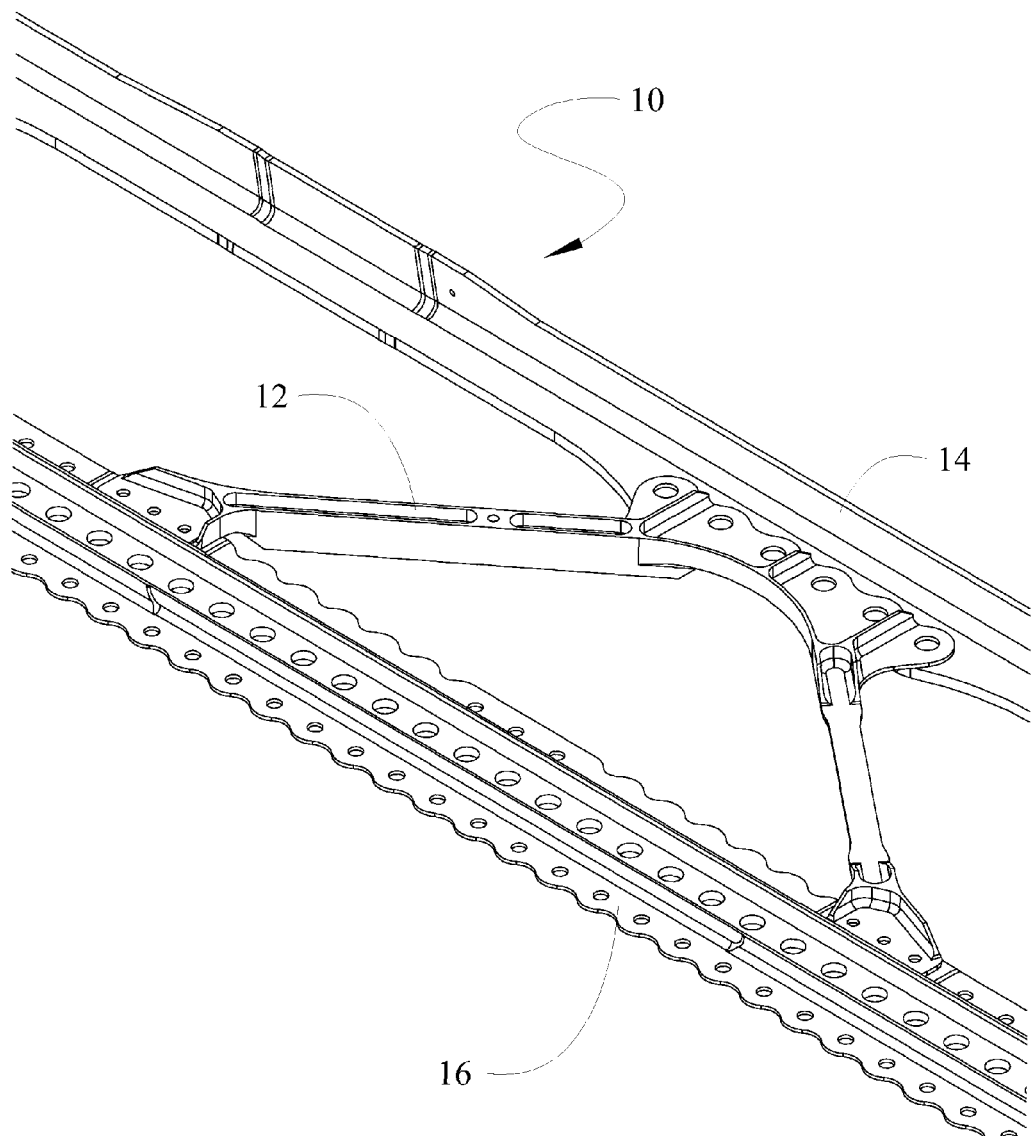
FIG. 3 is a pictorial view of an aircraft structural assembly with which the present embodiments may be employed.

The embodiments described herein provide an apparatus and method for machining of components for use in assembly in the methods or systems of an aircraft as defined in FIGS. 1 and 2 and described above or any similar structural assembly. Referring to FIG. 3, an example structural assembly 10 which is the environment in which a component 12 will be installed is shown. For the example, structural assembly 10 is a portion of a fuselage barrel with stringer 14 and seat track 16 installed and component 12 is a side body truss. In conventional assembly operation the component 12 would be match drilled in place for assembly into the overall structural assembly 10. However, due to ergonomic considerations and issues with FOD match drilling is not a desirable option.

Figure 4:
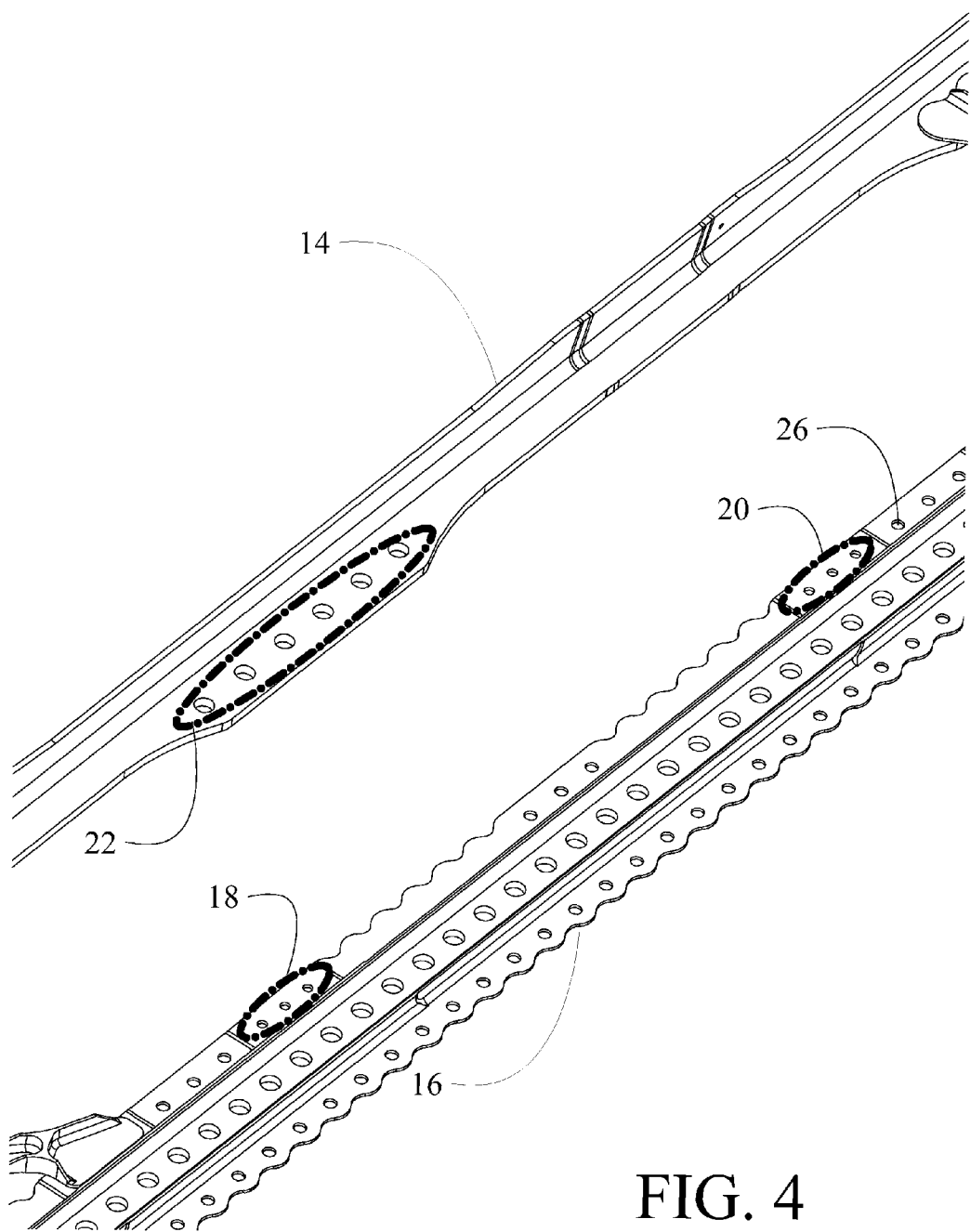
FIG. 4 is pictorial view of the stringer and seat track of the structural assembly of FIG. 3 prior to installation of the mating component.
Figure 5:
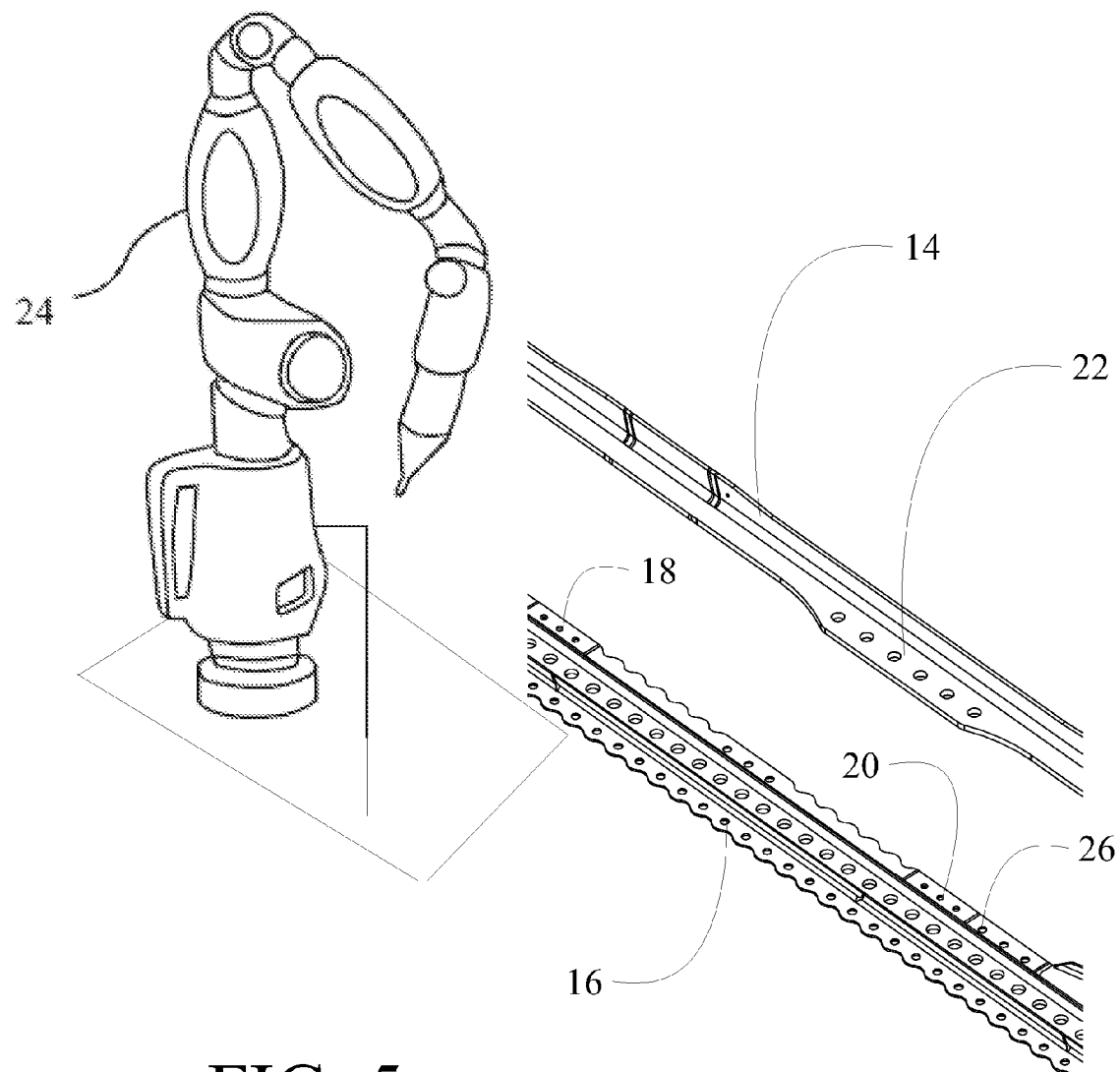
FIG. 5 is a representation of the metrology device employed for obtaining location information on mating holes in the aircraft structural assembly.
Figure 6:
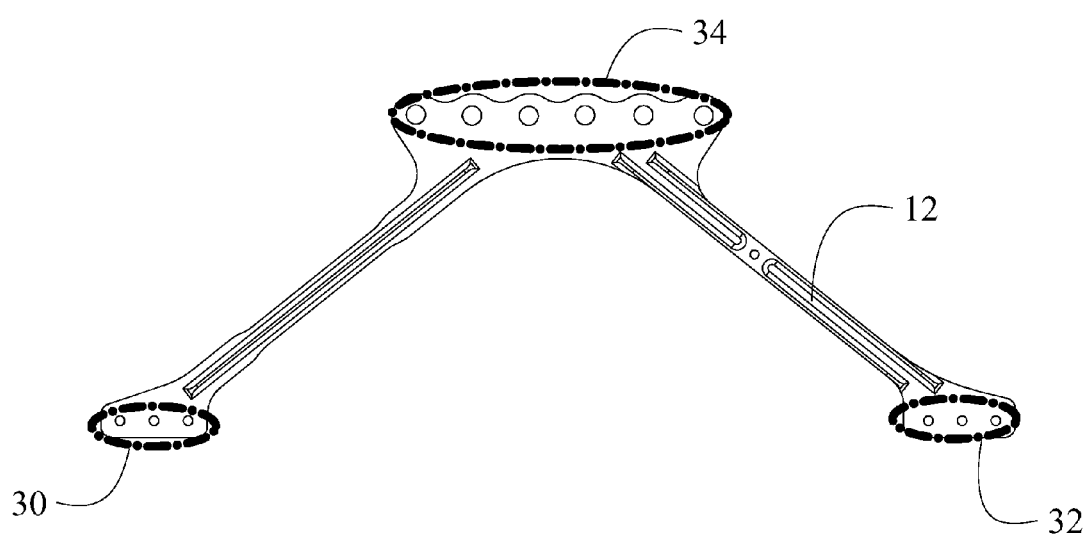
FIG. 6 is a top view of the mating component showing hole sets to be drilled using data from the present embodiments.

The present embodiments allow the structural assembly 10 to have hole sets 18, 20 and 22 drilled to full size during part fabrication prior to assembly and, once assembled as represented in FIG. 4, the relative positioning of the holes is established. Then, as shown in FIG. 5, a metrology device 24 such as a laser tracker, photogrammetry system or portable coordinate measurement machine, is employed to identify the location of a benchmark indicia 26 which orients the entire environment of the structural assembly 10 for relative positioning of the component 12. The benchmark indicia 26 may be a standard index point such as a master assembly hole defined in three dimensional (3D) computer aided design CAD) modeling of the structural assembly which provides an entire 3D definition of the environment. That location is then stored in a memory as will be described in greater detail subsequently. The metrology device 24 is them employed to measure the location and size of the hole sets 18, 20 and 22 relative to the benchmark indicia 26 and that data is also stored. Example measurements resulting may be an I, J, K unit vector for each hole within the environment, an X, Y, Z location for surface points on each mating surface within the environment, and an X, Y, Z representation of all part to part mating edges within the environment. The stored data is then transferred to a CNC system in which the relative location and size of the hole sets 18, 20 and 22 is then programmed for drilling in component 12, shown in FIG. 6. In exemplary embodiments, the memory for data storage may be a network server with communications access by both the metrology device (or a computer controller for the metrology device) and the CNC machining system. The full size matching hole sets 30, 32 and 34 are drilled in component 12 with reference to CAD models of the assembly using the benchmark indicia 26 for exact relative location of the holes based on the measured location data from the metrology device 24. An exact fitted match to hole sets 18, 20 and 22 in the assembled structural assembly 10 is thereby created. While hole sets are described herein for an exemplary process, alternative matching assembly features or other machining required for the component to be mated into the environment of the structural assembly may be machined using the embodiments described herein.

Figure 7:
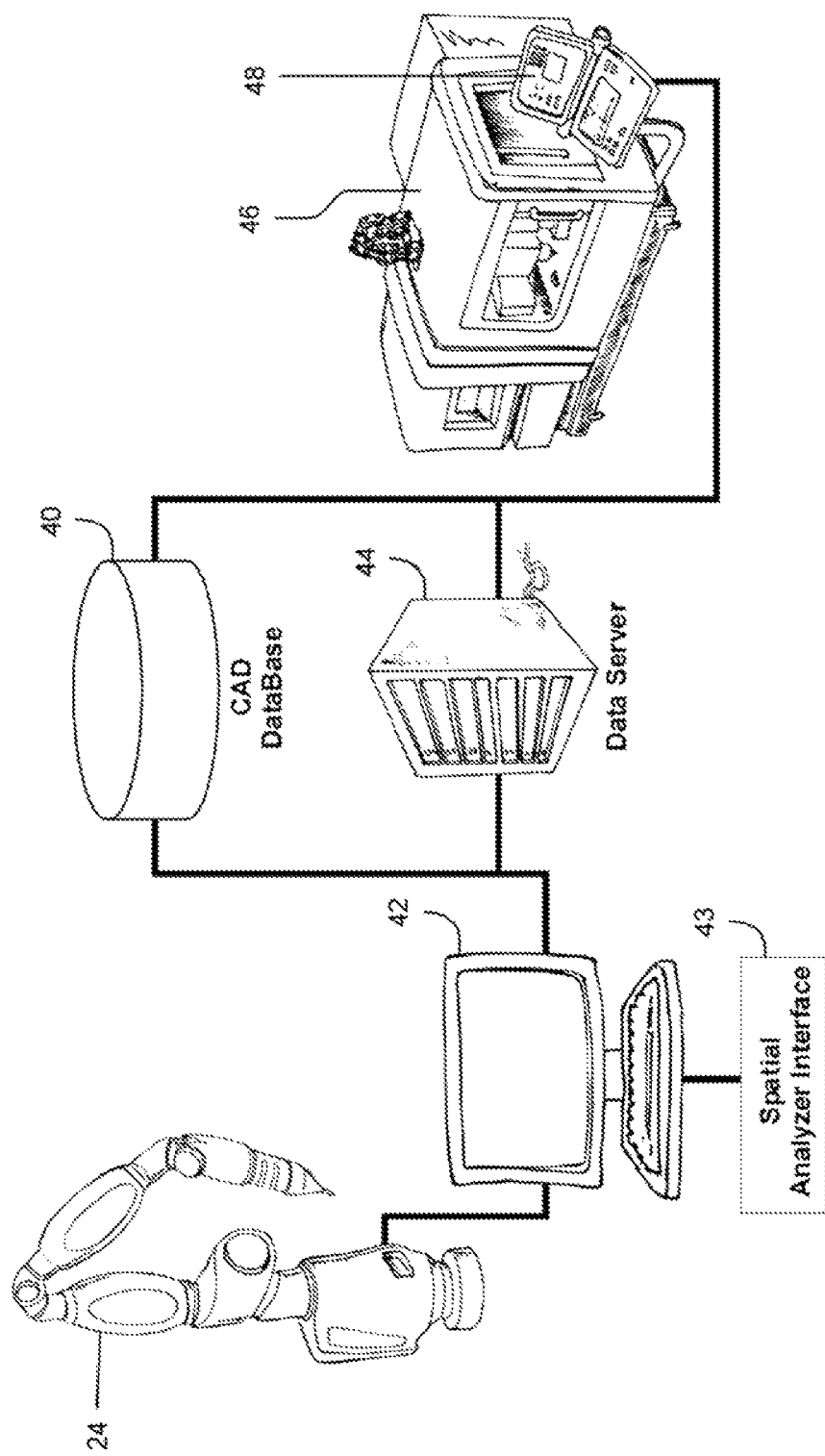
FIG. 7 is a block diagram of the physical and computing elements employed in the embodiment described; and, FIG. 8 is a flow chart for a method for employing embodiments of system as disclosed herein for drilling of mating component holes [please provide copy of drawing in native file format for preparation of formal drawings].

The elements of the ARMDP embodiment described herein are shown in FIG. 7. A CAD database 40 maintains 3D models of structural assemblies and components with which the system will be employed. The chosen metrology device 24 communicates with a local controller such as a laptop computer 42 which may be employed at the workstation. The computer 42 provides process implementation information to an operating technician through a spatial analyzer interface 43, as will be described in greater detail subsequently, and receives data input from the metrology device 24. Exemplary standard software such as SpatialAnalyzer® available from New River Kinematics (NRK), 436 McLaws Circle, Williamsburg, Va. 23185, CAM2 from Faro Technologies, 250 Technology Park Lake Mary, Fla. 32746 or Metrolog X4™ from Metrologic Group, 28064 Center Oaks Court, Wixom, Mich. 48393, may be used as the measurement interface. The computer 42 receives CAD model data from the CAD database 40, or in alternative embodiments stores the CAD model data internally, from which data for the appropriate benchmark indicia 26 may be provided to the metrology device 24 and presented to the operating technician using the spatial analyzer interface 43. Measurement data determined by the metrology device 24 as manipulated by the technician to predetermined measurement locations is transmitted for storage in a common memory which may be present on a data server 44 or similar device. Measurement data from the data server 44 and 3D model data from the CAD database 40 may then be communicated to a computer controller 46 for a CNC machining center 48 or similar computer aided manufacturing (CAM) device. The component 12 may then have matching hole sets 30, 32 and 34 drilled by the CNC machining center 48. While described herein as separate elements, those skilled in the art will recognize that the controller laptop computer 42, CAD database 40, data server 42 and CNC computer controller may all be incorporated in a common computer system which may employ either localized or distributed processing and direct interface, remote or web based communications.

Figure 8:
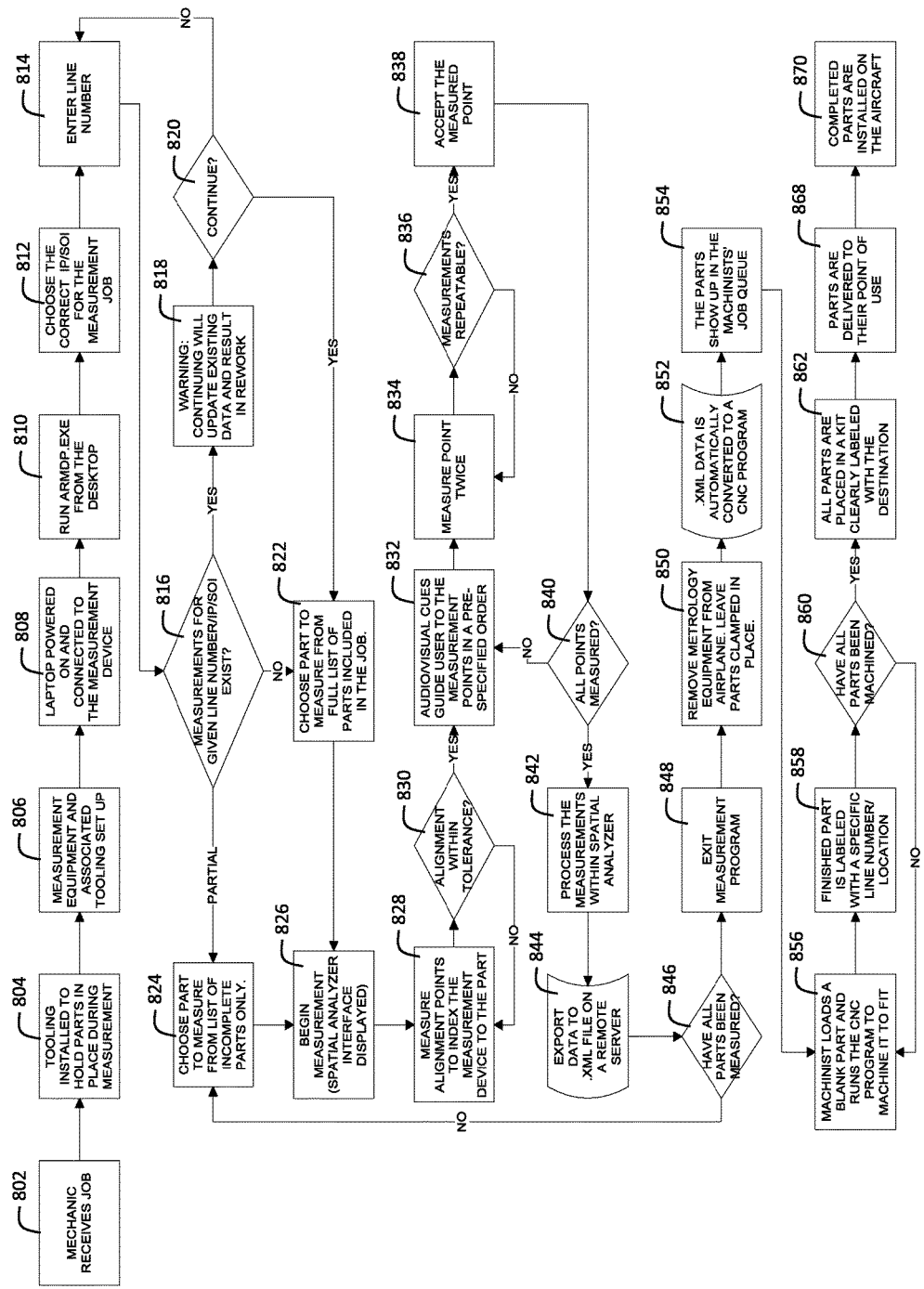

FIG. 8 provides a flow chart of an exemplary process flow employing the embodiment described above. The measurement job for the component to be inserted is received by the mechanic, step 802, and tooling is installed to hold parts in place in the structural assembly during measurement if required, step 804. The environment in which structural assembly exists may be in an assembly line or other fabrication station or within a completed system undergoing maintenance for replacing components. The metrology device 24 for conducting the measurement is set up, step 806, and the controller laptop 42 is powered and connected to the metrology device, step 808. The ARMDP program pre-stored on the laptop is then executed, step 810, which provides information and instructions to the mechanic regarding the measurement process, relevant CAD data, visualizations of the assembly and component(s) and measurement flow instructions. The mechanic then selects the correct Installation Plan/Shop Order Instance (IP/SOI) for the desired measurement, step 812, and enters the appropriate line number, step 814, for the component(s) to be assembled. A determination is then made if the line number and IP/SOI exist, i.e. the measurement process for the component(s) has already been completed, completely or partially, step 816. If already completed a warning is issued that remeasurement will replace existing data, step 818, and an option is provided, step 820, to return to reenter an alternative line number or continue. If the measurements have not been made, the mechanic then selects the component or part to be measured from a list of parts presented for the job, step 822. If the measurements were partially completed, the parts are selected form a list of incomplete parts, step 824. The laptop then displays information from a spatial analyzer interface to direct the mechanic regarding locations for measurement associated with the component, step 826. The benchmark indicia 26 is then measured to index the measurement device for orientation within the environment defined by the overall 3D CAD model for the following measurements of holes in the structure, step 828. A determination is then made if the measurement of the indicia is within required tolerance, step 830. If not, the measurement is repeated. If so, the audio or visual cues provided by the laptop guide the mechanic to measurement points associated with the component(s) in a pre-specified order, step 832. The measurement point is measured twice, for the described embodiment, step 834, and a determination is made if the two measurements are repeatable, step 836. If not, the measurements are remade. If repeatable, the measurements are then accepted, step 838. A determination is made if all pointes required have been measured, step 840. If not the process returns to step 832 to continue required measurements. If so, the measurements are processed within the spatial analyzer, step 842 and data is exported to the data server for storage, step 844. The exported data may include an I, J, K unit vector for each hole as measured within the environment defined by the CAD model, an X, Y, Z location for surface points on each mating surface as measured, and an X, Y, Z representation of all part to part mating edges (between the component(s) and structure and between any interfacing components) as measured. A determination is made if all components for installation at that line number have been measured, step 846 if not the process returns to step 824 to continue necessary measurements. If so, the measurement program is exited on the laptop, step 848 and the metrology equipment is removed from the assembly structure, step 850, leaving the structure in position for installation of the component(s). The measurement data store on the data server is then provided through the CNC machine computer controller 46 which generates necessary CNC instructions for machining the component(s), step 852. The components are delivered to the CNC machine job queue, step 854, and the machinist loads the blank parts and runs the "CNC program to machine the component with the necessary hole sets or alternative matching features, step 856. The finished component(s) are then appropriately labeled with line number information, step 858. A determination if made if all component(s) for the line number kit have been machined, step 860 and if not, steps 856 and 858 are repeated for the additional component(s). If complete, all component(s) as kitted are then for delivery to the line station, step 862, delivered to the line point of use, step 864 and installed in the structural assembly, step 866.

Having now described various embodiments of the disclosure in detail as required by the patent statutes, those skilled in the art will recognize modifications and substitutions to the specific embodiments disclosed herein. Such modifications are within the scope and intent of the present disclosure as defined in the following claims.

What is claimed is:

1. A method for fabricating a part, comprising:
   operating a metrology system to obtain physical characteristics for a structure in which a component is to be installed including measuring an X, Y, Z location for at least one defined hole in the structure in an environment;
   transferring the physical characteristics for the structure to a computer numerical control (CNC) machine; and
   fabricating the component to be compatible with the physical characteristics of the structure including machining at least one hole in the component to match the at least one defined hole using the CNC machine prior to installation in the environment.

2. The method according to claim 1 wherein transferring the physical characteristics for the structure further comprises:
   transferring data for the X, Y, Z location of the at least one defined hole to a memory for storage; and,
   providing the data from the memory to a controller for the CNC machine for conversion to a CNC program.

3. The method according to claim 2 wherein using the metrology system further comprises measuring an I, J, K unit vector for each hole as measured and transferring data further comprises transferring the I, J, K unit vector data.

4. The method according to claim 2 wherein using the metrology system further comprises measuring an X, Y, Z location for surface points on each mating surface as measured.

5. The method according to claim 2 wherein using the metrology system further comprises measuring an X, Y, Z representation of all part to part mating edges as measured.

6. The method according to claim 1 wherein the structure comprises a structural assembly undergoing fabrication on an assembly line.

7. The method according to claim 6 further comprising kitting the component for installation in the structural assembly.

8. The method according to claim 7 further comprising installing the kitted component in the structural assembly.

9. The method according to claim 1 wherein the environment includes a structural assembly undergoing maintenance.

10. The method according to claim 9 further comprising installing the component in the structural assembly.

11. A manufacturing system comprising:
    a metrology device operable to obtain physical characteristics for installed structure including measuring the X, Y, Z location for at least one defined hole in the structure in an environment;
    a computer numerical control (CNC) machine operable to fabricate a component compatible with the physical characteristics of the structure including machining at least one hole in the component to match the at least one defined hole; and
    a computer system programmed to receive data from said metrology device related to the physical characteristics, convert the received data into a format compatible with said CNC machine, and transmit the converted data to said CNC machine for fabrication of the component.

12. The manufacturing system as defined in claim 11 further comprising a computer aided design (CAD) database containing 3D models of the structure.

13. The manufacturing system as defined in claim 12 wherein the computer system comprises, in part, a controller at an assembly line station for interface to the metrology device.

14. The manufacturing system as defined in claim 13 wherein said controller incorporates a spatial analyzer interface communicating with the CAD database for defining measurement points within the environment for measurement by the metrology device.

15. The manufacturing system as defined in claim 14 wherein the computer system further comprises a control computer for the CNC machine communicating with the data server to receive the data from the metrology device and convert the received data into a CNC program.

16. The manufacturing system as defined in claim 13 wherein the computer system further comprises a data server in communication with the controller having a memory receiving the data from the metrology device.

17. The manufacturing system as defined in claim 11 wherein the metrology device is selected from the set of laser trackers, photogrammetry or portable coordinate measurement machines.

\* \* \* \* \*